United States Patent [19]
Price

[11] Patent Number: 5,435,367
[45] Date of Patent: Jul. 25, 1995

[54] VEHICLE TIRE ASSEMBLY

[76] Inventor: Charlene M. Price, 405 Garland St., Dothan, Ala. 36301

[21] Appl. No.: 114,930

[22] Filed: Sep. 3, 1993

[51] Int. Cl.⁶ .......................... B60C 7/10; B60C 7/24
[52] U.S. Cl. ...................................... 152/310; 152/324; 152/326; 152/375; 152/387
[58] Field of Search .............. 152/152, 185, 187, 189, 152/213 R, 218, 246, 301, 304, 305, 323-329, 375, 388, 390, 386, 398, 387, 310

[56] References Cited

U.S. PATENT DOCUMENTS

| | | | |
|---|---|---|---|
| 514,708 | 2/1894 | Finnigan | 152/386 |
| 614,055 | 11/1898 | Kendall | 152/375 |
| 649,053 | 5/1900 | Henderson | 152/375 |
| 655,049 | 7/1890 | Brown | 152/325 |
| 824,778 | 7/1906 | Burdick, Jr. | 152/325 |
| 1,091,005 | 3/1914 | McDill | 152/185 |
| 1,750,478 | 3/1930 | Koehler | 152/375 |
| 4,338,988 | 7/1982 | Brooks et al. | 152/213 R |

FOREIGN PATENT DOCUMENTS 0449599 3/1913 France .
0027947 of 1904 United Kingdom .
0025907 of 1909 United Kingdom .

Primary Examiner—Steven D. Maki

[57] ABSTRACT

A vehicle tire which comprises: a one piece tubular unit adapted to fit snugly over a vehicle wheel wherein said unit consists of a thick tire tread having a road-engaging surface and being formed of an elastomeric material such as rubber, synthetic rubber or the like; a plurality of deep grooves extending laterally through said thick tread and spaced around the entire periphery thereof; and a plurality of clamping members disposed within said grooves and extending therethrough to engage the wheel rim and to secure the one piece unit thereto, said clamps being inwardly spaced from the outer road-engaging surface of said tire tread.

3 Claims, 4 Drawing Sheets

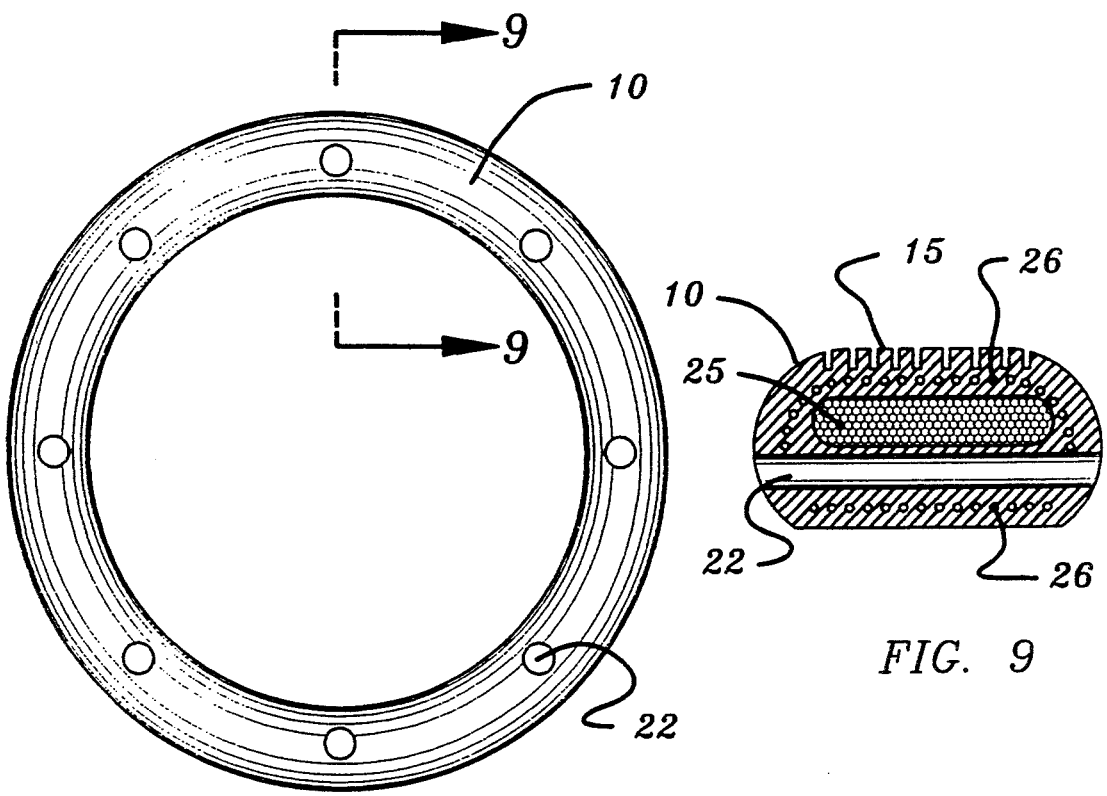
FIG. 8
FIG. 9
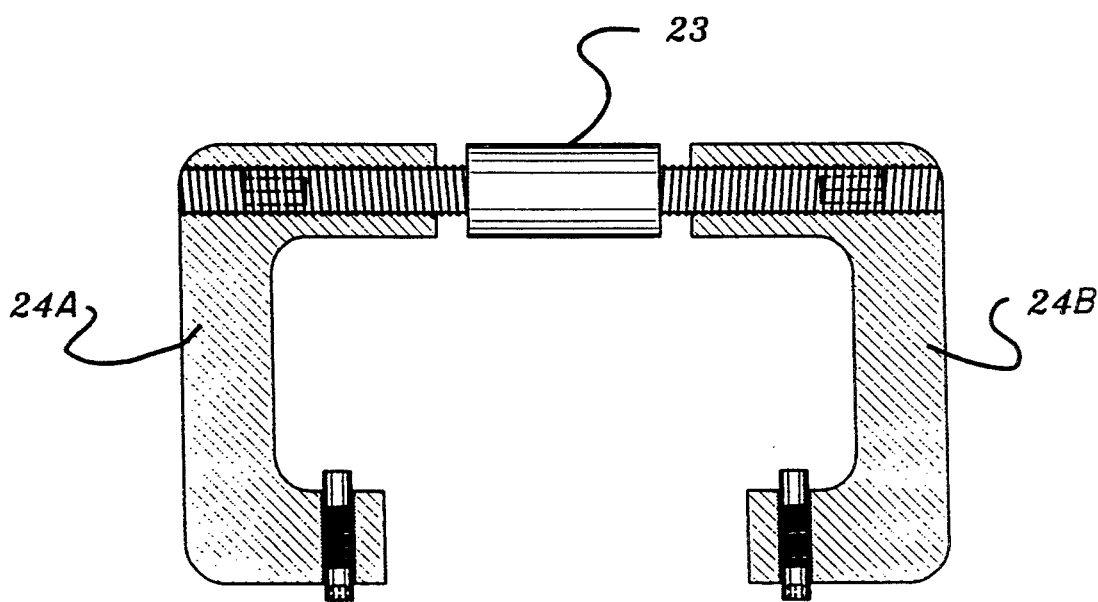
FIG. 10

VEHICLE TIRE ASSEMBLY

BACKGROUND OF THE INVENTION

1. Field of the Invention

The present invention relates to vehicle tires and more particularly pertains to tires which may be readily mounted on or removed from a vehicle wheel rim.

2. Description of the Prior Art

The use of non-pneumatic vehicle tires is known in the prior art. More specifically, such tires heretofore devised and utilized for the purpose of mounting on vehicle wheel rims are known to consist basically of familiar, expected and obvious structural configurations, notwithstanding the myriad of designs encompassed by the crowded prior art which have been developed for the fulfillment of countless objectives and requirements.

In this respect, the vehicle tire according to the present invention substantially departs from the conventional concepts and designs of the prior art, and in so doing provides an apparatus primarily developed for the purpose of ease of mounting on and removal from a vehicle wheel rim.

Therefore, it can be appreciated that there exists a continuing need for new and improved vehicle tires which can be easily mounted on a vehicle wheel rim. In this regard, the present invention substantially fulfills this need.

SUMMARY OF THE INVENTION

In view of the foregoing disadvantages inherent in the known types of vehicle tires now present in the prior art, the present invention provides an improved non-pneumatic vehicle tire construction wherein the same can be readily mounted or demounted on a vehicle wheel rim. As such, the general purpose of the present invention, which will be described subsequently in greater detail, is to provide a new and improved vehicle tire and method which has all the advantages of the prior art tires and none of the disadvantages.

To attain this, the present invention essentially relates to a vehicle tire which comprises: a one piece tubular unit adapted to fit snugly over a vehicle wheel wherein said unit consists of a thick tire tread having a road-engaging surface and being formed of an elastomeric material such as rubber, synthetic rubber or the like; a plurality of deep grooves extending laterally through said thick tread and spaced around the entire periphery thereof; and a plurality of clamping members disposed within said grooves and extending therethrough to engage the wheel rim and to secure the one piece unit thereto, said clamps being inwardly spaced from the outer road-engaging surface of said tire tread.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved vehicle tire which has all the advantages of the prior art tires and none of the disadvantages.

It is another object of the present invention to provide a new and improved vehicle tire which may be easily and efficiently manufactured and marketed.

It is a further object of the present invention to provide a new and improved vehicle tire which is of a durable and reliable construction.

An even further object of the present invention is to provide a new and improved vehicle tire which is susceptible of a low cost of manufacture with regard to both materials and labor, and which accordingly is then susceptible of low prices of sale to the consuming public, thereby making such tires economically available to the buying public.

Still yet another object of the present invention is to provide a new and improved vehicle tire which provides in the apparatuses and methods of the prior art some of the advantages thereof, while simultaneously overcoming some of the disadvantages normally associated therewith.

Still another object of the present invention is to provide a new and improved vehicle tire which can easily be mounted on or removed from a vehicle wheel rim.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 8 is a side plan view of a modification of the tire of the present invention.

FIG. 9 is a sectional view on line 9—9 of FIG. 8.

FIG. 10 is a sectional plan view of a clamp designed for use in the modification of FIGS. 8 and 9.

DESCRIPTION OF THE PREFERRED EMBODIMENT

Figure 1:
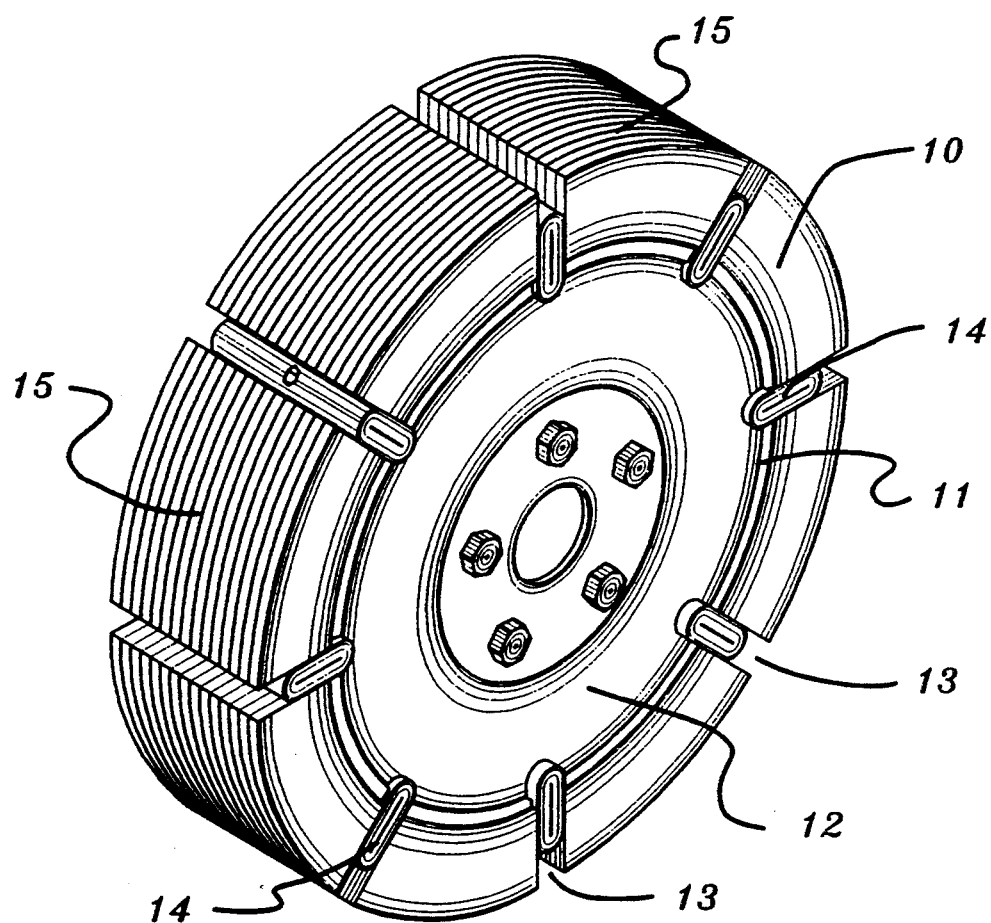
FIG. 1 is a perspective view of a vehicle wheel with the tire of the present invention mounted thereon.

With reference now to the drawings, and in particular to FIG. 1 thereof, a new and improved vehicle tire embodying the principles and concepts of the present invention and generally designated by the reference numeral 10 will be described.

Figure 2:
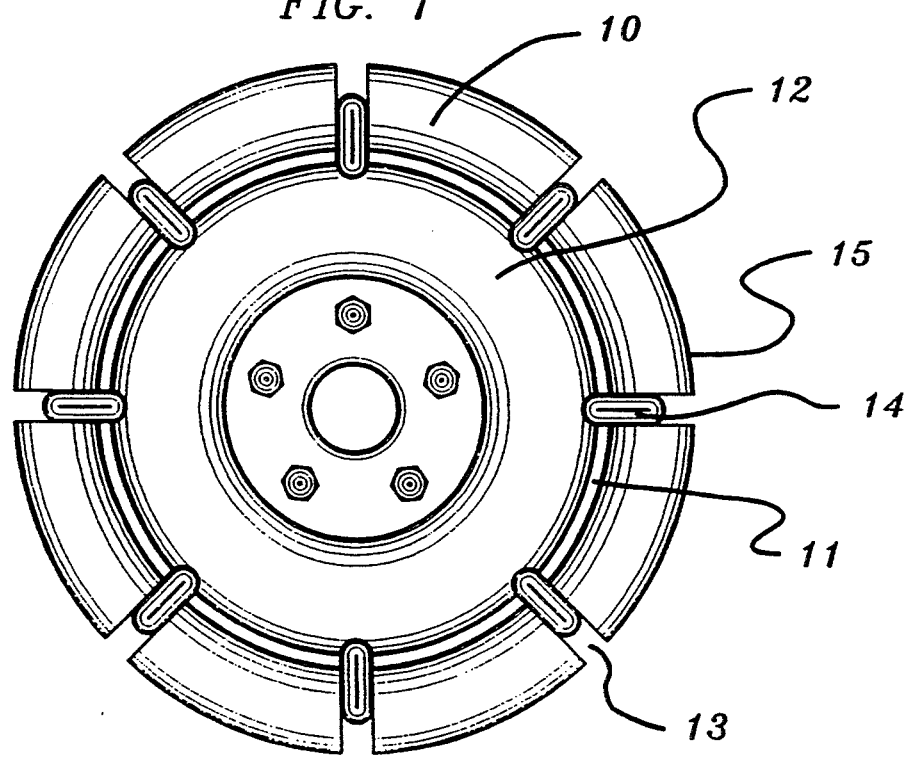
FIG. 2 is a side plan view of the wheel in FIG. 1.

Vehicle tire 10 is of the solid non-pneumatic type and, as shown, consists of a continuous, thick, elastomeric, circumferentially grooved tire tread adapted to fit onto the rim 11 of a vehicle wheel 12. Uniformly spaced about the periphery of tire 10 are a plurality of deep, laterally extending recesses or grooves 13. Disposed within and extending therethrough from side to side of tire 10 are a plurality of clamping members 14 adapted to engage with and fasten to wheel rim 11. It will be noted that clamping members 14 extend well below the grooved road-contacting surface 15 of tire 10. FIG. 2 illustrates this in a side plan view of the tire and wheel of FIG. 1.

Figure 3:
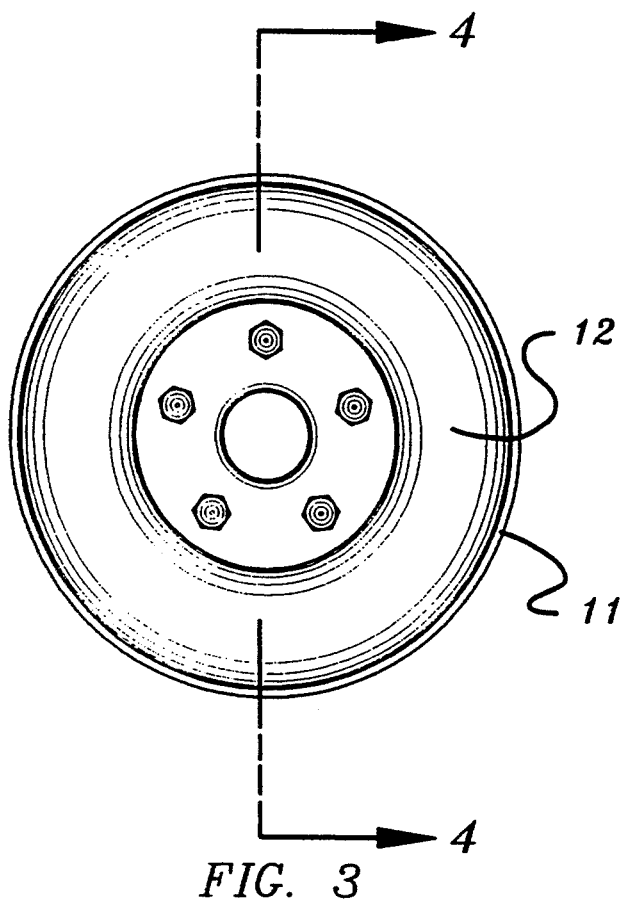
FIG. 3 is a side plan view of a vehicle wheel on which the tire of the present invention may be mounted.
Figure 4:
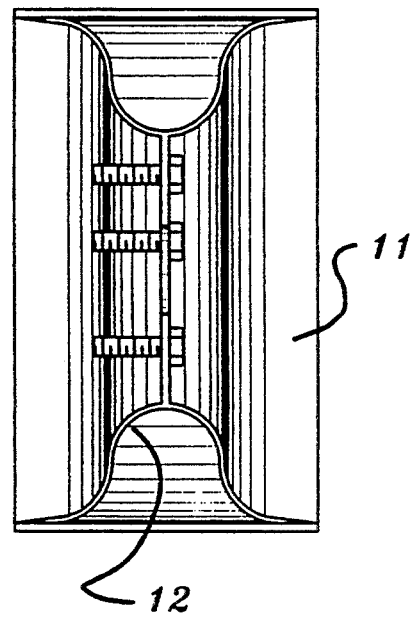
FIG. 4 is an end sectional view on line 4—4 of FIG. 3.

FIGS. 3 and 4 show a typical vehicle wheel illustrating in particular the flared rim 11 on such wheel 12.

Figure 5:
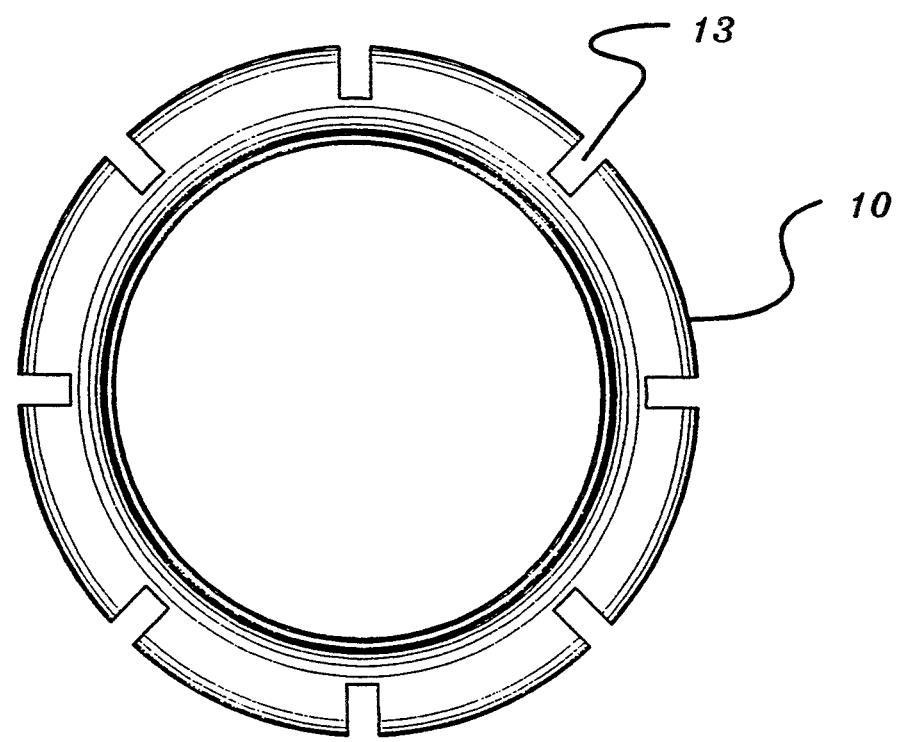
FIG. 5 is a side plan view of the tire of the present invention.

FIG. 5 shows the tire 10 of the present invention and in particular illustrates that the lateral grooves 13 extend well down into the solid tire 10 to provide assurance that when clamp members 14 are inserted, the surface of such clamp members 14 will be well below the road contacting surface 15 of tire 10.

Figure 6:
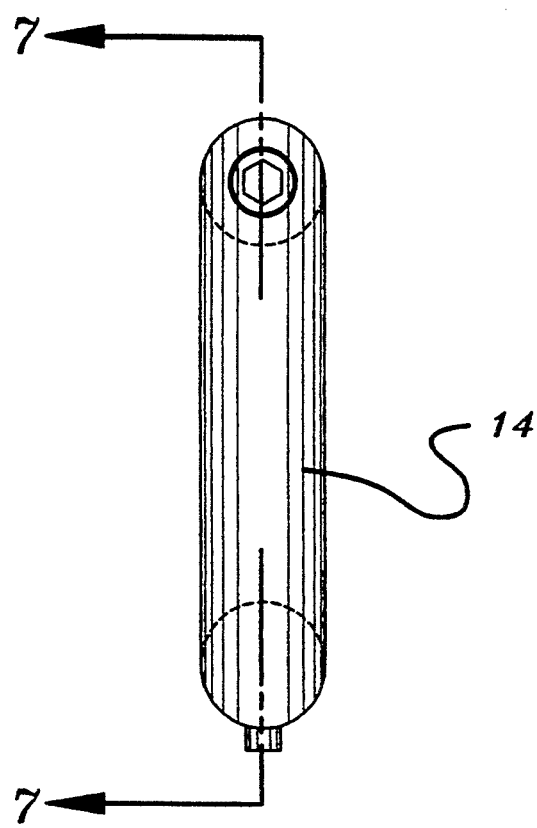
FIG. 6 is a perspective view of one of the clamp members of the present invention.
Figure 7:
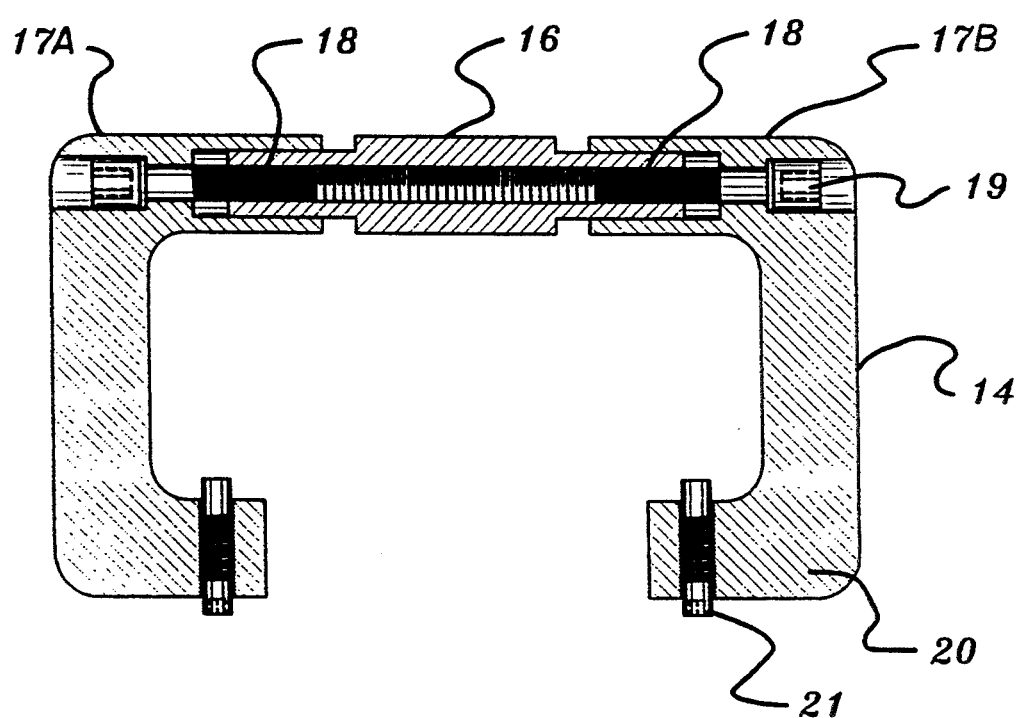
FIG. 7 is a sectional view on line 7—7 of FIG. 6.

FIGS. 6 and 7 show a preferred form of the clamp members 14 and illustrate the means to snugly engage the tire 10 to the vehicle wheel. The clamp member 14 is designed for varying widths of tires 10 and is made in three sections, a center section 16 being threadably engaged with the two end sections 17A, 17B by threaded bolts 18 (preferably using an Allen wrench type head 19). Tightening bolts 18 causes the clamp to tightly engage the sides of tire 10. The end sections 17A, 17B are of the C-clamp type and the lower arms 20 each have a set screw 21 therein to permit tightening the clamp against the wheel rim on which tire 10 is mounted.

Specifically, each of said C-clamps 14, as illustrated in FIG. 7, includes a center section 16 having first and second ends with a first threaded bore extending into the first end and a second threaded bore extending into the second end. The threaded bores are arranged so as to be substantially colinearly oriented as illustrated. The C-clamps 14 each further include a first C-shaped end section 17A having a first unthreaded bore and a first bolt extending through the first unthreaded bore and threadably engaged to the first threaded bore, with a second C-shaped end section 17B having a second unthreaded bore and a second bolt extending through the second unthreaded bore and threadably engaged to the second threaded bore. By this structure, the C-clamps 14 can be selectively adjusted to a desired width.

FIGS. 8 through 10 illustrate a modified tire 10 wherein instead of grooves extending down through the tread, ports or holes 22 are provided about the side periphery of the tire 10, said holes 22 extending completely through the tire 10. The clamp member 14 is inserted through the hole 22 (one C-clamp arm being unattached during such operation) and then the sections 23 and 24A, 24B are threaded together, and the clamp 14 fastened to the rim as described above. As shown in FIG. 9, the tire 10 may be more sophisticated in construction, i.e. it may have a flexible resilient core 25 of foam or the like to provide more cushioning and may be reinforced with flexible steel wires 26 extending through the elastomeric matrix of tire 10.

As shown in FIG. 10, the clamp member of the modified tire 10 includes a center section 23 having first and second ends with a first threaded rod extending from said first end and a second threaded rod extending from said second end. The threaded rods are substantially colinearly oriented. A first C-shaped end section 24A includes a first threaded bore to which the first threaded rod is threadably engaged, with a C-shaped end section 24B having a second threaded bore to which the second threaded rod is threadably engaged. The first end section 24A includes an unlabeled first lower arm extending therefrom, with the second end section 24B including an unlabeled second lower arm extending from said second end section. By this structure, the C-clamps of the modified tire 10 can also be selectively adjusted to a desired width.

By virtue of the clamp members shown above, securing of the tire to the wheel rim is very positive, and does not depend upon the stretching, shoe-horn type fastening of the prior art tires. This allows use of a tire which will easily slip on over the rim of a vehicle wheel without the use of special prying tools. Further, the tire of the present invention lends itself well to being used as a spare tire for automobiles equipped with the normal pneumatic tires since no modification of the vehicle wheel rim is required. A big advantage of the tire of the present invention when used as a spare is the much smaller space required in the trunk for storage and the elimination of the worry that one's spare tire is not inflated.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A vehicle tire assembly comprising a vehicle wheel having a flared wheel rim defining circumferential flanges on opposed outer lateral sides of said vehicle wheel;

an elastomeric tire tread having a plurality of spaced, laterally extending grooves; and, a plurality of C-clamps, each of said C-clamps being received within an individual one of said grooves of said tire tread and engaged to said flanges to secure said tire tread to said vehicle wheel, each of said C-clamps comprising three sections, a first linear center section having first and second ends with each end having a threaded bore extending into and colinearly with the center section, and second and third C-Shaped end sections each having a first and second end wherein the first ends of each of said C-shaped end sections have an unthreaded bore with a bolt extending through said unthreaded bore and threadably engaged to one of said threaded bores of said center section thereby joining said C-shaped end sections to the center section, the second ends of each C-shaped end section having a set screw directed therethrough to engage the inner surface of one of said flanges, whereby tightening of said set screws permits tightening of the clamp against the wheel rim and tightening of said bolts draws said clamp toward a center of said wheel.

2. A vehicle tire assembly comprising a vehicle wheel having a flared wheel rim defining circumferential flanges on opposed outer lateral sides of said vehicle wheel;

an elastomeric tire tread having a plurality of spaced, laterally extending ports; and, a plurality of C-clamps, each of said C-clamps being received within an individual one of said ports of said tire tread and engaged to said flanges to secure said tire tread to said vehicle wheel, each of said C-clamps comprising three sections, a first linear center section having first and second ends with colinearly oriented threaded rods extending from each end, second and third C-shaped end sections each having a first end and a second end wherein the first ends of each of said C-shaped end sections have a threaded bore threadably engaged to one of said threaded rods, the second ends of each C-shaped end section having a set screw directed therethrough to engage the inner surface of said flanges, whereby tightening of said set screws permits tightening of the clamp against the wheel rim.

3. The vehicle tire assembly of claim 2, wherein said tire tread comprises a flexible resilient foam core embedded within an elastomeric matrix, and a plurality of steel wires extending circumferentially through said elastomeric matrix.

* * * * *